United States Patent Office 2,811,284
Patented Oct. 29, 1957

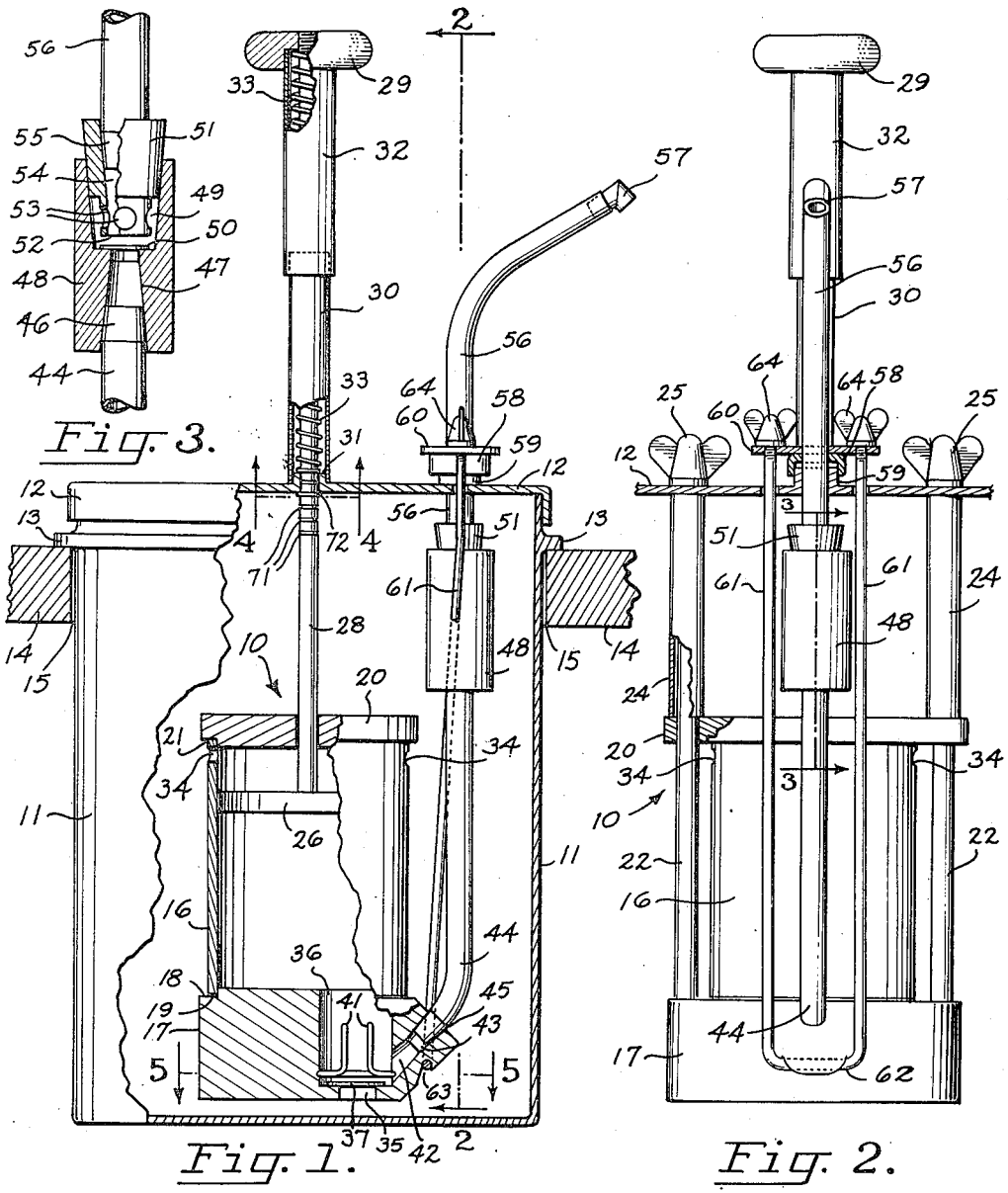

2,811,284
DISPENSER FOR LIQUIDS
Tony Rogers, Milwaukie, Oreg.
Application June 23, 1955, Serial No. 517,536
6 Claims. (Cl. 222—173)

This invention pertains to dispensers for liquids, and relates particularly to the novel construction of a dispenser for liquid foods which are required to be measured in predetermined quantities.

Because of the sanitation requirements imposed upon such commercial establishments as restaurants and soda fountains, the preparation of such food drinks as milk shakes heretofore has involved the manual ladling of a required quantity of milk from a bulk storage supply. This procedure has been followed primarily because there has not been available heretofore a mechanical dispenser capable of being cleaned with practicable facility and to the thoroughness required by sanitation codes. Hence, the ladling procedure has continued, with the attending congestion in the working area, inaccuracies of measurements and loss of valuable time.

There are available large cabinet model dispensers which incorporate refrigerating units. However, these dispensers do not provide automatic measuring of a predetermined quantity of liquid. Furthermore, they cannot dispense iced milk which, at the desired temperature of 32° F., contains a suspension of ice particles. Moreover, they are bulky in size and therefore not suitable for use in the characteristically confined quarters of a fountain. Still further, they are expensive and therefore not available to the majority of establishments which operate on limited financial budgets.

Accordingly, it is a principal object of the present invention to provide a dispenser for liquid foods, which dispenser may be thoroughly cleaned with speed and facility and to the degree required by sanitation codes.

Another important object of this invention is the provision of a dispenser capable of metering a predetermined quantity of liquid food, the dispenser being particularly suited to the dispensing of iced milk.

Still another important object of the present invention is to provide a dispenser for liquid foods, which dispenser is compact in size and is capable of being mounted in a conventional ice cream refrigeration compartment.

A further important object of this invention is to provide a dispenser which is adjustable to meter varying amounts of liquid and which functions automatically after metering a predetermined quantity of liquid to store a measured quantity of liquid for subsequent dispensing.

A still further important object of the present invention is to provide a dispenser for liquid foods, which dispenser is of simplified construction for economical manufacture, which is operated with facility and precision, and which is capable of assembly and disassembly with maximum speed and facility.

The foregoing and other objects and advantages of the present invention appear from the following detailed description, taken in connection with the accompanying drawing, in which:

Figure 1 is a view in side elevation, partly in section, of a dispenser embodying the features of the present invention, the same being shown mounted in the top lid of a conventional ice cream refrigerating compartment;

Figure 2 is a sectional view taken along the line 2—2 in Figure 1, and showing further details of construction of the dispenser;

Figure 3 is a fragmentary sectional view taken along the line 3—3 in Figure 2;

Figure 4 is a sectional view taken along the line 4—4 in Figure 1;

Figure 5 is a sectional view taken along the line 5—5 in Figure 1; and

Figure 6 is a fragmentary sectional view showing a modified form of tensioning means for securing parts of the dispenser together.

The dispenser comprises a pump, indicated generally at 10, supported removably within a container 11 by attachment to a removable lid 12 for said container. The container preferably is of the standard size and shape conventionally employed in soda fountains for the storage of milk, ice cream and other food products. Such a container is generally provided with an outwardly extending annular shoulder 13 adjacent the open end. Accordingly, the container is conveniently mounted in a top lid 14 of a conventional ice cream refrigeration cabinet by providing an opening 15 therethrough having a diameter substantially equal to the diameter of the container. Thus, the container extends into the ice cream refrigerating compartment and is supported therein by abutment of the shoulder 13 with the lid 14.

The pump 10 comprises a cylinder 16 which is open at its top and bottom ends. A base plate 17 is provided with an annular groove 18 adapted to receive the bottom end of the cylinder to close the latter. A ring seal 19, of rubber, cork, or other suitable material, is provided in the anular groove to form a liquid seal between the cylinder and base plate.

A top plate 20 is also provided with an annular recess 21 for receiving the top end of cylinder 16, whereby to close the latter. The assembly of cylinder 16, base plate 17, and base plate 20 is secured together releasably by means of the rods 22 which extend upwardly from their lower ends, which are secured to the base plate 17, through openings in the top plate 20, on the outside of cylinder 16. The rods 22 project upwardly from the top plate through openings in the lid 12, as best shown in Figure 2. Spacer sleeves 24 encircle the rods and extend between the upper surface of the top plate and the under surface of lid 12, to position the cylinder a predetermined distance below the lid. Wing nuts 25 are then applied to the upper threaded ends of the rods to draw the assembly into firm engagement with the lid.

Within the cylinder 16 there is removably contained a piston 26, which may be provided with an annular sealing ring to minimize the escape of liquid around the piston. The piston is slidable within the cylinder, and said movement is effected by means of piston rod 28 which is secured at its bottom end to the piston and extends upwardly through an opening in the lid 12. The upper end of the piston rod is provided with a handle 29.

The section of piston rod 28 above the lid 12 preferably is enclosed by a lower tubular sleeve 30 which is centered frictionally on a boss 31 projecting from the lid 12, and the upper tubular sleeve 32, which is adapted to telescope slidably over the lower section 30. The upper sleeve 32 is secured to handle 29, by such means as the interengaging threads, illustrated in Figure 1.

The piston 26 is urged toward its uppermost position, shown in Figure 1, by means of coil spring 33 which extends from the upper surface of the boss 31 to the handle 29. Thus, as the piston 26 is moved downward by pressure on the handle, the spring is compressed. Then, upon release of the handle the spring expands, whereby the piston is returned automatically to its upward-most position of retraction.

Openings 34 are provided in cylinder 16 adjacent the upper end thereof to permit free retraction of piston 26 by the spring 33 and to prevent resistance to the downward movement of the piston during the dispensing operation.

Referring now particularly to Figures 1 and 5 of the drawing, an inlet valve is provided for drawing the liquid food from container 11 into the cylinder 16 below the piston 26. This valve is formed in the base plate 17 by the pair of openings 35, 36. The upper opening 36 is larger in diameter than the lower opening 35, whereby to provide an annular shoulder therebetween. A disc valve 37 rests upon the shoulder within the opening 36. Upward displacement of the disc valve is limited by such means as the inturned sections 38 of the wire keeper 39 which is supported in spaced relation above the valve 37 by means of the annular groove 40 formed in the wall of opening 36 adjacent the bottom end thereof. The ends 41 of the inturned sections 38 are extended upwardly for convenient grasp by the fingers to facilitate removal of the keeper for cleansing.

Referring now to Figures 1, 2 and 3 of the drawing, the pump is provided with an outlet valve and discharge port for metering liquid food from the container. In the base plate 17 there is provided an outlet opening 42 which communicates with the interior of cylinder 16 through opening 36 and terminates at its outer end in the outwardly flared section 43. An outlet tube 44 is formed at its lower end with a corresponding tapered section 45, whereby to be received frictionally within the flared end 43. The upper end of this outlet tube is similarly tapered, as at 46, for frictional engagement within the flared opening 47 in valve housing 48. The flared opening 47 communicates inwardly with an oppositely tapered chamber 49, in which is contained a disc check valve 50. The upward displacement of this valve is restricted by means of the hollow tapered adapter plug 51, the lower end 52 of which terminates a spaced distance above the valve and is provided with radial ports 53 which communicate between the chamber 49 and the tapered opening 54 of the adapter plug.

The tapered opening 54 is adapted to receive frictionally therein the tapered end 55 of a second section of outlet tubing 56. This second section extends upwardly through an opening in lid 12 and terminates arcuately outward in a discharge spout 57 which is preferably formed as a separate element and frictionally secured to the tubing for ready removal to facilitate cleansing.

Means is provided to maintain tension on each of the tapered connecting sections 45, 46, 51 and 55, to insure against leakage. In the embodiment illustrated in Figures 1 and 2, the upper section 56 of outlet tubing is provided adjacent the outer side of lid 12 with a cap member 58 which extends radially outward from the tubing and has a downwardly extending flange adapted freely to encircle an upstanding boss 59 on the lid surrounding the tubing section 56. A plate 60 freely encircles the tubing and rests upon the cap 58. The plate is provided with spaced openings adapted to receive therethrough the threaded ends of a U-shaped clamp member 61. The closed end 62 of the clamp member releasably engages a notch 63 formed in the base plate 17, and the free ends of the clamp extend through the lid 12 and plate 60 to receive the wing nuts 64. Thus, by tightening these wing nuts the compressive pressure exerted between the cap 58 and base plate 17 functions to draw the tapered connection together firmly to provide a fluid seal.

The modified tensioning means illustrated in Figure 6 of the drawing may be substituted for the elements 58—64 described hereinbefore. The upper tubing section 56 is provided with an annular shoulder 66 adjacent the tapered end 55 below the lid 12. A resilient gasket 67, of rubber or other similar material, is fitted onto the tubing section 56 above the shoulder 66, for abutment with the under side of the lid 12. An upwardly extending section 68 of the gasket is preferably provided to extend through and seal the opening in the lid through which the tubing section 56 projects. A coil spring 69 extends between the shoulder 66 and gasket 67, whereby to exert a downward pressure from the lid to the tapered connections.

Means also is provided for regulating the amount of liquid dispensed by the pump. As best shown in Figures 1 and 4 of the drawing, the piston rod 28 is provided with a plurality of longitudinally spaced circumferential grooves 71. A spring clip abutment member 72, best shown in Figure 4, is adapted to be secured removably in any one of the grooves and functions by abutment with the under side of lid 12 (Figure 1) to limit the upward retraction of piston 26 in the cylinder 16. Thus, the capacity of the cylinder under the piston may be adjusted within wide limits to accommodate the dispensing of diverse quantities of liquids.

Since the dispenser is particularly suited for mounting in the ice cream refrigerating cabinet used in soda fountains, its use will now be described with reference to the preparation of milk shakes. The container 11 is filled with milk and supported within the refrigerated compartment of an ice cream cabinet by means of shoulder 13 in the manner previously described. The lid 12, with the pump 10 attached, is then installed upon the container with the pump extending into the supply of milk.

It will be understood that the milk is permitted to chill, preferably to 32° F., to a condition in which the milk contains a suspension of ice particles.

Preliminary to dispensing a quantity of milk, handle 29 is first pushed downward to expel the air from cylinder 16 below the piston 26. The handle is then released, whereupon spring 33 urges the piston to its retracted position. It is to be understood, of course, that abutment clip 72 has been installed in the proper groove 71 on piston rod 28 at which the volume of cylinder 16 below the retracted piston 26 is equal to the volume of milk desired to be dispensed for a milk shake.

As the piston 26 is retracted by spring 33, the vacuum created under the piston causes the inlet valve disc 37 to rise to the limit of the spring abutment 38, thereby permitting the iced milk to be drawn from the container 11 through the openings 35, 36 into the cylinder 16. When the piston has reached its limit of retraction, the inlet valve disc lowers by gravity onto the shoulder between the openings 35, 36, thereby preventing the milk drawn into cylinder 16 from being returned to the container.

When it is desired to prepare a milk shake, a milk shake container is placed under the outlet spout 57 and the handle 29 pushed downwardly. The piston 26 is thereby depressed, and the iced milk is forced upwardly through outlet tube section 44, past the elevated check valve 50 and thence through outlet tube section 56 and discharge spout.

It is to be noted that when the quantity of iced milk has been dispensed from spout 57 and handle 29 released, the retraction of piston 26 again creates a vacuum, whereby to effect refilling of the cylinder with iced milk from container 11, in readiness for the preparation of a subsequent milk shake. Further, during the retraction of piston 26, the check valve 50 is returned to its closed position, thereby preventing the milk contained within the outlet tube 44 from returning to the cylinder. Since the check valve thus prevents air from being drawn from the atmosphere into the cylinder 16, the latter is assured of being filled to its adjusted capacity with iced milk from container 11.

It is to be noted further that the cylinder 16 is disposed adjacent the bottom of the container 11 and that the major portion of the latter is contained within the refrigerated compartment. Accordingly, the volume of liquid stored in the pump cylinder 16 after each dispensing operation is assured of being maintained at the refrigerating temperature.

The dispenser of the present invention is capable of complete disassembly, whereby to afford complete and thorough cleansing of the various parts. Disassembly of the modification illustrated in Figures 1 to 5 is achieved merely by removing wing nuts 25 and 64 and disconnecting handle 29 from piston rod 28. The rods 22 then may be removed, whereupon the cylinder 16, the bottom plate 17, the top plate 20 and sleeves 24 separate into individual elements. Simultaneously, outlet tubes 44, 56 and interconnecting valve housing 48 may be detached at their tapered connections. With the modification shown in Figure 6, disassembly is achieved merely by removing the wing nuts 25 and handle 29.

Maximum sanitation is maintained not only by virtue of complete disassembly, but also because of the absence of threaded connections between the parts which are to be immersed in the milk content of container 11.

From the foregoing, it is apparent that the present invention provides a dispenser of simplified and therefore economical manufacture; it is compact in size for convenient mounting in a conventional ice cream storage cabinet; it is particularly suited to the dispensing of milk which contains particles of ice; and it is capable of complete disassembly for thorough cleansing in accordance with sanitation codes. Thus, the present invention provides to soda fountains and other similar establishments a metering dispenser which is accurate in operation, is an inexpensive investment and utilizes no added space, since it is accommodated within the space of the ice cream storage cabinet.

It will be apparent to those skilled in the art that various changes may be made in the details of construction described hereinbefore without departing from the scope and spirit of this invention. Accordingly, it is to be understood that the foregoing description is primarily illustrative of the invention and is not to be considered as limiting the scope thereof.

Having now described my invention and the manner in which the same may be used, what I claim as new and desire to secure by Letters Patent is:

1. A dispenser for liquid foods, comprising a container, a removable lid for the container, a pump cylinder open at its bottom end, a base member detachably clamped to the pump cylinder for sealing the bottom end of the pump cylinder, support means extending upwardly from the cylinder for attachment to the container lid, a piston movable within the cylinder, actuating means extending from the piston upwardly through the lid, inlet valve means in the base member communicating with the interiors of the cylinder and container, outlet passage means communicating with the bottom end of the cylinder and extending upwardly from the base member through the lid and terminating in a dispensing spout, friction connection means between the outlet passage means and base member, and adjustable compression means engaging the outlet passage means above the friction connection means for urging the latter into sealing position.

2. The dispenser of claim 1 wherein the adjustable compression means urging said connection means into sealing position comprises abutment means on the outlet passage means above the friction connection means, and adjustable clamp means releasably interconnecting the abutment means and the base member.

3. The dispenser of claim 1 wherein the adjustable compression means urging said connection means into sealing position comprises abutment means on the outlet passage means above the friction connection means and below the lid, and spring means extending removably between the abutment means and the under side of the lid.

4. A dispenser for liquid foods, comprising a container, a removable lid for the container, a pump cylinder open at both ends, a base member and a top member for detachably sealing the open ends of the pump cylinder, connector means releasably interconnecting the base member and the top member, the connector means extending upwardly from the top member for attachment to the container lid, spacer means on the connector means between the top member and container lid for supporting the cylinder in spaced relation below the lid, a piston movable within the cylinder, actuating means extending from the piston upwardly through the lid, inlet valve means in the base member communicating with the interiors of the cylinder and container, outlet passage means communicating with the bottom end of the cylinder and extending upwardly from the base member through the lid and terminating in a dispensing spout, check valve means in the outlet passage means below the lid, friction connection means between the outlet passage means and base member and check valve means, and means engaging the outlet passage means above the uppermost friction connection means for urging said connection means into sealing position.

5. In combination with a refrigeration cabinet having a top door provided with an opening therethrough, a dispenser for liquid foods, comprising a container having an open top and an outwardly extending peripheral flange adjacent said open end, the container being mounted removably in the top door opening with the said flange abutting the door, a removable lid for closing the open end of the container, a pump cylinder open at its bottom end, a base member detachably clamped to the pump cylinder for sealing the bottom end of the pump cylinder, support means extending upwardly from the cylinder for attachment to the container lid, a piston movable within the cylinder, actuating means extending from the piston upwardly through the lid, inlet valve means in the base member communicating with the interiors of the cylinder and container, outlet passage means communicating with the bottom end of the cylinder and extending upwardly through the lid and terminating in a dispensing spout, friction connection means between the outlet passage means and base member, and adjustable compression means engaging the outlet passage means above the friction connection means for urging the latter into sealing position.

6. In combination with a refrigeration cabinet having a top door provided with an opening therethrough, a dispenser for liquid foods, comprising a container having an open top and an outwardly extending peripheral flange adjacent said open end, the container being mounted removably in the top door opening with the said flange abutting the door, a removable lid for closing the open end of the container, a pump cylinder open at both ends, a base member and a top member for detachably sealing the open ends of the pump cylinder, connector means releasably interconnecting the base member and the top member, the connector means extending upwardly from the top member for attachment to the container lid, spacer means on the connector means between the top member and container lid for supporting the cylinder in spaced relation below the lid, a piston movable within the cylinder, actuating means extending from the piston upwardly through the lid, inlet valve means in the base member communicating with the interiors of the cylinder and container, outlet passage means communicating with the bottom end of the cylinder and extending upwardly from the base member through the lid and terminating in a dispensing spout, check valve means in the outlet passage means below the lid, tapered friction connection means between the outlet passage means and base member and check valve means, and means engaging the outlet passage means above the uppermost friction connection means for urging said connection means into sealing position.

References Cited in the file of this patent

UNITED STATES PATENTS

| 580,322 | Lauderdale | Apr. 6, 1897 |
| 1,784,977 | Seitz | Dec. 16, 1930 |
| 1,789,338 | Kooperstein | Jan. 20, 1931 |
| 1,918,903 | Fletcher | July 18, 1933 |
| 1,919,173 | Schutt | July 18, 1933 |